(12) United States Patent
Buchenberg

(10) Patent No.: US 9,327,852 B2
(45) Date of Patent: May 3, 2016

(54) TRAY SEALER WITH A TRAY FEEDER AND A METHOD FOR A PACKAGING FACILITY

(71) Applicant: Multivac Sepp Haggenmüller GmbH & Co. KG, Wolfertschwenden (DE)

(72) Inventor: Wolfgang Buchenberg, Oy-Mittelberg (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 14/276,842

(22) Filed: May 13, 2014

(65) Prior Publication Data
US 2014/0374217 A1 Dec. 25, 2014

(30) Foreign Application Priority Data

Jun. 25, 2013 (EP) ..................................... 13173591

(51) Int. Cl.
| | | |
|---|---|---|
| *B65B 35/44* | (2006.01) | |
| *B65G 19/20* | (2006.01) | |
| *B65B 7/16* | (2006.01) | |
| *B65B 31/02* | (2006.01) | |
| *B65B 35/36* | (2006.01) | |
| *B65B 43/46* | (2006.01) | |
| *B65B 43/52* | (2006.01) | |
| *B65G 47/26* | (2006.01) | |

(52) U.S. Cl.
CPC ............... *B65B 7/164* (2013.01); *B65B 31/028* (2013.01); *B65B 35/36* (2013.01); *B65B 35/44* (2013.01); *B65B 43/46* (2013.01); *B65B 43/52* (2013.01); *B65G 47/26* (2013.01)

(58) Field of Classification Search
CPC ................................. B65B 35/44; B65G 19/24
USPC ..................... 198/413, 415, 617, 726; 53/537
See application file for complete search history.

(56) References Cited

U.S. PATENT DOCUMENTS

| | | | | |
|---|---|---|---|---|
| 3,902,587 A | * | 9/1975 | Checcucci | ................. 198/419.3 |
| 4,164,996 A | * | 8/1979 | Tomlinson | ................... 198/415 |
| 4,186,544 A | * | 2/1980 | Johnson | .......................... 53/537 |
| 4,214,419 A | * | 7/1980 | Allen et al. | ..................... 53/543 |
| 4,505,093 A | * | 3/1985 | Johnson | .......................... 53/531 |
| 4,525,977 A | * | 7/1985 | Matt | .............................. 53/55 |
| 4,574,566 A | * | 3/1986 | Eaves et al. | .................... 53/450 |
| 4,768,642 A | * | 9/1988 | Hunter | ....................... 198/419.2 |

(Continued)

FOREIGN PATENT DOCUMENTS

| | | |
|---|---|---|
| DE | 69923892 T2 | 4/2006 |
| DE | 102008030510 A1 | 1/2010 |

(Continued)

*Primary Examiner* — Douglas Hess
(74) *Attorney, Agent, or Firm* — Husch Blackwell LLP

(57) ABSTRACT

A tray sealer that may be incorporated into a packaging facility, the tray sealer may include a tray feeder for collecting a plurality of trays that are conveyed on a continuously moving chain feeder. An embodiment of the tray feeder may comprise at least two train chains. Each train chain may be independently moveable and each train chain may be operable grouping the plurality of the trays into groups and transferring the groups to a sealing station. The group of trays may have number of trays that corresponds to the operation of the sealing station. The tray sealer may include the transfer of a group of trays by a gripper system to a sealing station of the tray sealer.

12 Claims, 3 Drawing Sheets

(56) References Cited

U.S. PATENT DOCUMENTS

| | | | |
|---|---|---|---|
| 4,850,472 A * | 7/1989 | Liebel et al. | 198/409 |
| 4,928,810 A * | 5/1990 | Hultberg | 198/699.1 |
| 5,044,876 A * | 9/1991 | Stohlquist | 414/798.2 |
| 5,368,151 A * | 11/1994 | Klenk | 198/426 |
| 5,419,097 A * | 5/1995 | Gorlich et al. | 53/432 |
| 5,475,965 A * | 12/1995 | Mondini | 53/287 |
| 5,937,620 A * | 8/1999 | Chalendar | 53/566 |
| 6,019,213 A | 2/2000 | Schubert | |
| 6,161,678 A * | 12/2000 | Cassoli et al. | 198/626.6 |
| 6,260,690 B1 * | 7/2001 | Batzer | 198/626.5 |
| 6,293,544 B1 * | 9/2001 | Fedinatz | 271/243 |
| 6,698,576 B2 * | 3/2004 | Hahnel et al. | 198/469.1 |
| 6,799,410 B2 * | 10/2004 | Gamberini | 53/233 |
| 6,945,530 B2 * | 9/2005 | Cinotti et al. | 271/240 |
| 6,953,113 B2 * | 10/2005 | Iwasa et al. | 198/419.1 |
| 7,588,239 B2 * | 9/2009 | Marcinik et al. | 270/52.18 |
| 8,056,704 B2 * | 11/2011 | Christ | 198/617 |
| 8,056,898 B2 * | 11/2011 | Folsom et al. | 271/233 |
| 8,381,497 B2 * | 2/2013 | Scheibel | B65B 9/02 53/170 |
| 8,978,870 B2 * | 3/2015 | Viatte | 198/418.7 |
| 2011/0072764 A1 | 3/2011 | Daniek et al. | |

FOREIGN PATENT DOCUMENTS

| | | |
|---|---|---|
| EP | 0594917 A1 | 5/1994 |
| EP | 0695703 A1 | 2/1996 |
| EP | 1298079 A1 | 4/2003 |

* cited by examiner

TRAY SEALER WITH A TRAY FEEDER AND A METHOD FOR A PACKAGING FACILITY

CROSS-REFERENCE TO RELATED APPLICATIONS

This Application claims priority to European Patent Application Number 13173591.2 filed Jun. 25, 2013, to Wolfgang Buchenberg entitled "Tray Sealer with a Tray Feeder and a Method for a Packaging Facility," currently pending, the entire disclosure of which is incorporated herein by reference.

FIELD OF THE INVENTION

The invention relates to a tray sealer for sealing trays filled with products.

BACKGROUND OF THE INVENTION

A tray sealer is known from DE 102008030510 A1 comprising at least two feeding belts to form and position a group of trays for a gripper system at a respective distance relative to each other so that the trays can be transferred by a gripper system into the sealing station. The trays filled with a product are commonly provided to the feeding belts by an intermittently operating chain feeder and are received in a start/stop operation from the first feeding belt following upstream, the so-called collection belt, of the tray sealer. Alternatively, the trays can be halted upstream of the first feeding belt using a stopper and be provided as buffered trays closely spaced. An intermittently operating chain feeder in which the trays are manually filled with products along the transport path is disadvantageous and not ergonomic for the operating staff. A continuously moving chain feeder is much better for manual loading.

One embodiment of a continuously operated tray feeder is described in the still unpublished EP 12006757 of the applicant. Here the trays are provided on a continuously moving chain feeder with predetermined spacing to the two feeding belts for being received and grouped as well as posited for the gripper system of tray sealer. The trays transported on the chain feeder are, for example, automatically filled by fillers moving along with the chain feeder. To enable improved grouping for the feeding belts while at the same time continuously providing trays, a gap, which is respectively advantageous for the intermittently operating gripper system, is already provided on the chain feeder between the groups of trays so that the feeding belts can, independently of the provision of trays by the chain feeder at least for a specific period of time, transport the group of trays to a position at which the gripper system takes them from the second feeding belt and feeds them to a sealing station of the tray sealer. Since only a complete group may be processed in the sealing station or have a top film be sealed onto the tray edge, respectively, it must be ensured that the defined arrangement of trays and gaps is maintained on the chain guide. Errors can be detected by inspection using sensors for the presence of trays, but in the event of an error, a correction must be made and the operation of the chain feeder must be halted. Errors caused by the operating staff, for example, due to a missing tray or a tray incorrectly inserted into the gap lead to a halt in the operation of the tray sealer and consequently of the chain feeder, which results in downtime and lesser productivity.

SUMMARY OF THE INVENTION

The object of the present invention is to provide a tray sealer with a tray feeder for a continuously operated chain feeder for a tray sealer and a method for operating such a tray feeder that does not exhibit the drawbacks mentioned above, so that in particular, a gap between groups of trays on a chain feeder can be eliminated.

The tray feeder according to the invention for collecting trays from a continuously moving chain feeder and for grouping said trays is characterized in that the tray feeder comprises at least one first and one second train chain, each comprising its own drive and its own pusher elements. The train chains are thereby operable separately from each other and allow collecting a group of trays from a chain feeder using a first train chain and—independent thereof—simultaneous positioning of the group of trays for further transport to a sealing station by a gripper system of a tray sealer using a second train chain. The pusher elements being attached to the train chains transport the trays in a pushing manner. The advantage arises that a continuously moving chain feeder no longer needs to have a gap, as it is known from mentioned prior art, and trays that are not present or missing no longer lead to a halt which results in lesser downtime and increased production.

A train chain can be provided as a single chain with pusher elements attached to one side. The chain can be embodied as a link chain, a toothed belt or the like. The train chain can also comprise two parallel and jointly driven chains or belts, where the pusher elements are there arranged between the chains and with their ends are attached to each of the two chains.

The term "train chain" in the context of the invention means that such a chain can transport a "train" of trays, i.e. a group of trays of a certain number, which are arranged consecutively in the direction of transport. The length of the train, i.e. the number of trays arranged consecutively in a group can, for example, be predetermined by the number of pusher elements connected to the train chain. By providing at least two train chains each with its own drive, the invention allows the trays to be collected from a continuous feed stream and have individual "trains" depart at a higher speed from the transfer point once they are completed.

Once a train chain is at the end of tray feeder freed from the trays that it transported, it can again be driven back, possibly at a high speed, to the transfer point at the beginning of the tray feeder. The train chain arrives there preferably in such a timely manner that it again receive first trays, which were after completion transferred to another train chain, without slowing down the feed stream of trays.

The train chains are preferably configured to transport a single group of trays, where the spacing of the individual trays of a group relative to each other are formed when transferring the trays from the chain feeder onto the train chain. The number of the group of trays corresponds to the number of trays that are with one transport motion taken by the gripper system of the tray sealer from the train chain and thereby from the tray feeder and transferred into a sealing station.

Alternatively, the train chains are configured along their path at a plurality of sections to be able to transport a group of trays, where the groups each have the same number of trays. This is particularly advantageous with a large number of trays in a group, longer transport distances, or for a further filling the trays with, for example, a liquid or pasty product on the tray feeder itself, where at least one third train chain should be provided in the region of the tray feeder in the event of the further filling.

Generally, the train chain comprises at least one section on which a train, or a group of trays, respectively, can be collected, as well as other free sections. Once a complete train of trays was removed from the train chain, this train chain can be moved forward—possibly at increased speed—such that a section for collecting a new train of trays is again provided at the beginning of the tray feeder. With very long conveying distances of the tray feeder, it can happen that the speeds of the train chains required for this would be extremely high in order to again provide a section at the starting point for collecting a new train. In this case, it can be advantageous if the train chain has a plurality of sections along its path each for collecting one train of trays. The reason is that the train chain must then be moved forward only by such a short distance that the next free section for collecting trays is provided at the starting point of the tray feeder.

The train chains are provided preferably in a superimposed fashion oriented along a common track to subsequently transport the groups of trays along the common track. In this, the track is the path along which the trays are transported in the direction of transport. The fact that the train chains are provided "superimposed" along a common track means that the path along which the trays move in the direction of transport (for example, in direct continuation of a respective transport path along the chain feeder) is swept over by the pusher elements of all train chains. This can be achieved, for example, in that each train chain comprises a first and a second transport chain, of which one is arranged in the conveying direction to the right and the other in the conveying direction to the left adjacent to the path taken by the trays. The two transport chains associated with a common train chain can in particular be connected to each other by pusher elements.

In an advantageous embodiment, a lifting device is provided in order to present the trays for further transport by a gripper system of a tray sealer. The lifting device bridges the pusher elements of the train chain, so that the group of trays is transported by the gripper system in a barrier-free manner into the sealing station of tray sealer.

A tray sealer preferably comprises the tray feeder according to the invention to improve performance or to reduce downtime, respectively.

The group of trays preferably has a number that is equal to the number of trays that are collected by the gripper system from the tray feeder and transferred into the sealing station of the tray sealer, as, for example, a missing tray can during processing in the sealing station cause problems, for example, in that a top film in the region of the missing tray sticks to the sealing tool lower part.

A continuously moving chain feeder, from which the tray feeder collects trays thereby creating a predefined spacing between successive trays using the pusher elements of the train chains, is preferably provided in a direction of transport upstream of the tray feeder. The spacing of the pusher elements for a group of trays relative to each other are equal and are related to the grippers of the gripper system.

A sensor is provided preferably at the end of the chain feeder located downstream in the direction of transport to detect the presence of a tray prior to the transfer to the tray feeder. This ensures that a group on a train chain always has the required number of trays, and no tray is missing in front of or between the pusher elements. Missing trays on the chain feeder therefore do not lead to problems or downtime of the tray feeder or the tray sealer, respectively, this increases process reliability.

The tray sealer preferably comprises a control unit for evaluating the sensor and for controlling the tray feeder. Evaluation of the sensor ensures that a group always has its intended total number of trays. Controlling the tray feeder is done by actuating the individual drives of the train chains, preferably servo motors, to move the tray with small changes in acceleration. This in turn allows an increase in the performance of the packaging machine with liquid or pasty products.

Preferably, the tray sealer comprises a control unit with which the train chains of the tray feeder are controllable for collecting the trays, which are provided upstream of the chain feeder, independently of each other using the first train chain, and to transport the group of trays with the second train chain to a removal position for being collected by the gripper system which is provided downstream. Once the gripper system has collected the trays and the lifting device has been lowered into its normal position, the second train chain moves the pusher elements preferably in a very short time to the front end of the tray feeder to repeatedly collect a newly arriving tray from the chain feeder after the previously last tray has been taken by the other train chain and the completed group has been transported onward.

The method according to the invention for operating a packaging facility comprising a tray sealer with the tray feeder previously described according to the invention and a continuously moving chain feeder is characterized in that the trays are transferred from the chain feeder to the first transport chain of the tray feeder individually one after the other, until a group of the first train chain is completed.

Other aspects and advantages of the present invention will be apparent from the following detailed description of the preferred embodiments and the accompanying drawing figures.

DESCRIPTION OF THE SEVERAL VIEWS OF THE DRAWING

The accompanying drawings form a part of the specification and are to be read in conjunction therewith, in which like reference numerals are employed to indicate like or similar parts in the various views.

DETAILED DESCRIPTION OF THE INVENTION

The following detailed description of the present invention references the accompanying drawing figures that illustrate specific embodiments in which the invention can be practiced. The embodiments are intended to describe aspects of the present invention in sufficient detail to enable those skilled in the art to practice the invention. Other embodiments can be utilized and changes can be made without departing from the spirit and scope of the present invention. The present invention is defined by the appended claims and, therefore, the description is not to be taken in a limiting sense and shall not limit the scope of equivalents to which such claims are entitled.

Figure 1:
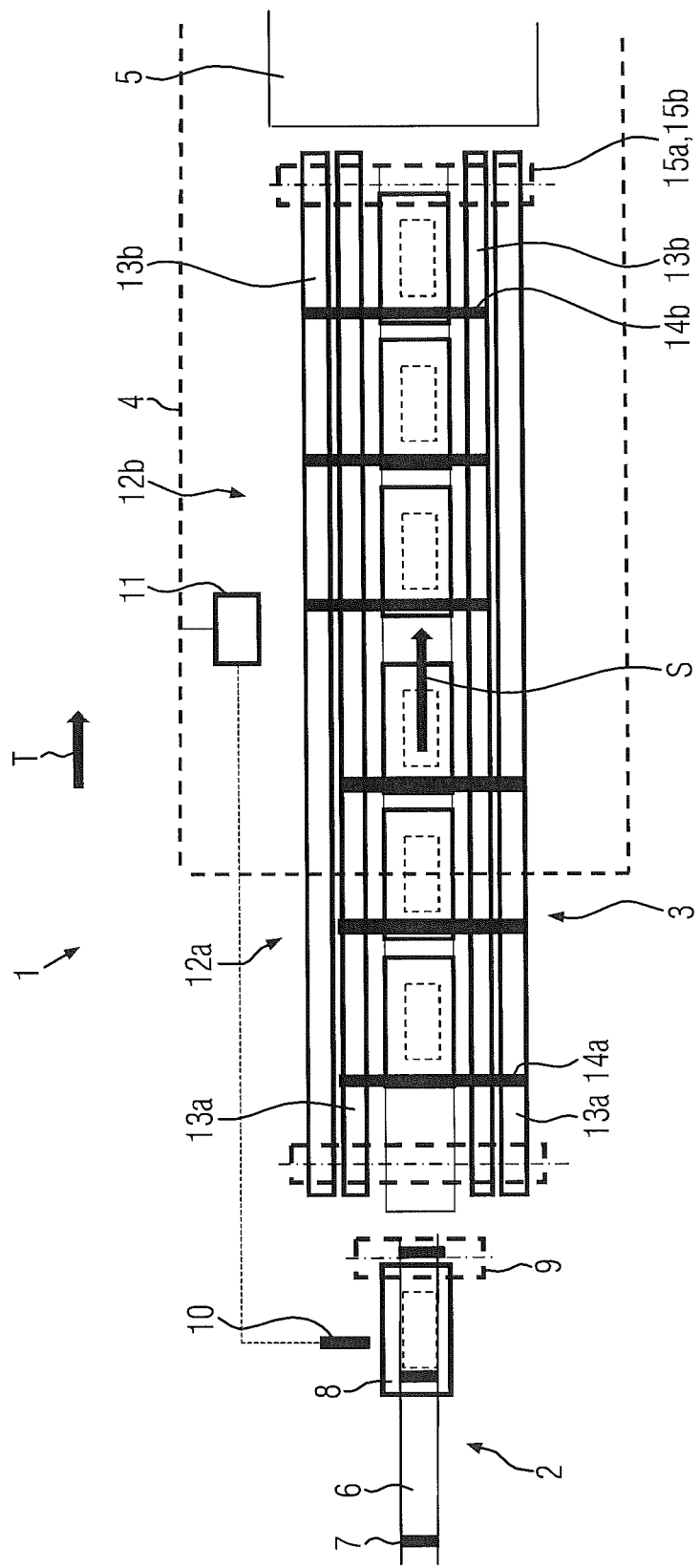
FIG. 1 is a schematic top plan view of a packaging facility with a tray feeder in accordance with one embodiment of the present invention.

FIG. 1 shows an embodiment of the present packaging facility 1 with a continuously moving chain feeder 2, a tray feeder 3 according to the invention, and a tray sealer 4—merely indicated—comprising a sealing station 5. The chain feeder 2 comprises a chain 6 with pusher elements 7 with which trays 8 filled with a product are provided in a direction of transport T to the tray feeder 3. A drive 9 is designed as a servo motor and attached to the end of the chain feeder 2 for driving the link chain 6 at a constant speed. A sensor 10 being provided at the end of the chain feeder 2 is configured to detect the presence of a tray 8 immediately prior to being transferred to the tray feeder 3 and to forward that information to a control unit 11.

FIG. 1 shows an embodiment of the tray feeder 3 in an embodiment with a first train chain 12a and a second train chain 12b which each comprise two transport chains 13a, 13b, each transport chain 13a and 13b having three pusher elements 14a and 14b respectively attached as shown. More specifically, the first train chain 12a may comprise two transport chains 13a, wherein one transport chain 13a is arranged on the right and one transport chain 13a is arranged on the left of a track S upon which the trays 8 are conveyed along the tray feeder 3. These two transport chains 13a are connected with each other by pusher elements 14a which span therebetween. The three pusher elements 14a define a section of the first train chain 12a, the section of the first train chain 12a being designed to collect and to transport a train, i.e. a group of three trays 8.

Similarly, as shown in FIG. 1, the second train chain 12b comprises two transport chains 13b, wherein one transport chain 13b is arranged on the right and one transport chain 13b is arranged on the left of the track S upon which the trays 8 are conveyed along the tray feeder 3. These two transport chains 13b of the second train chain 12b are connected with each other by three pusher elements 14b. The three pusher elements 14b define a section of the second train chain 12b which can collect and transport a train, i.e. a group of in this case three trays. The two train chains 12a, 12b are therefore in this embodiment "superimposed" in the sense that the path, i.e. the track S, taken by the trays 8 along the tray feeder 3 is swept over by both the pusher elements 14a of the first train chain 12a as well as by the pusher elements 14b of the second train chain 12b.

The first train chain 12a is driven by a first drive 15a and the second train chain 12b by a second drive 15b, preferably by servo motors, located at the downstream end of the tray feeder 3. The trays 8 are moved along a common track S in the direction of transport T.

Figure 2A:
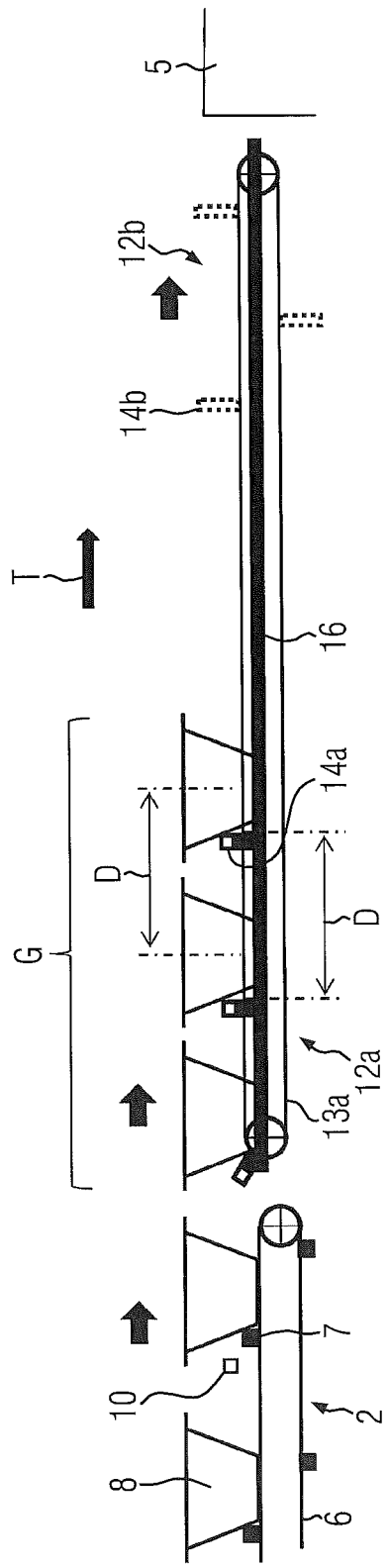
FIG. 2a is a schematic side view of the tray feeder of FIG. 1 with a chain feeder collecting trays.

The operation sequence or transport of the trays 8 along the packaging facility 1 shall be explained in more detail with reference to FIGS. 2a to 2d. FIG. 2a in a schematic side view shows an embodiment of the chain feeder 2 continuously and equidistantly transporting the trays 8 at a constant speed in the direction of transport T towards the tray feeder 3. By using the sensor 10, an embodiment of which may be in the simplest form a light barrier, the presence of a tray 8 is detected for transferring it to the tray feeder 3. During the transfer, the tray 8 to be transferred is pushed by the pusher element 7 of the link chain 6 to a transport support 16 of the tray feeder 3 and then transported onwards by a pusher element 14a of the first train chain 12a. If the sensor 10 detects a tray 8 being missing, then the first train chain 12a waits until the continuously moving chain feeder 2 provides a subsequent tray 8 for the transfer. The position of the trays 8 relative to each other and, in this example, a total group G of three trays 8 in this example is defined by a distance D between two successive pusher elements 14a of the first train chain 12a. FIG. 2a schematically also shows the pusher elements 14b of the second train chain 12b in dashed lines. The second train chain 12b is on its way to the beginning of the tray feeder 3 to collect a next tray 8 as the first of a new group G from the chain feeder 2, without the chain feeder 2 needing to interrupt its continuous operation. The arrows indicate the movement of the link chain 6, the first 12a, and the second train chain 12b.

Figure 2B:
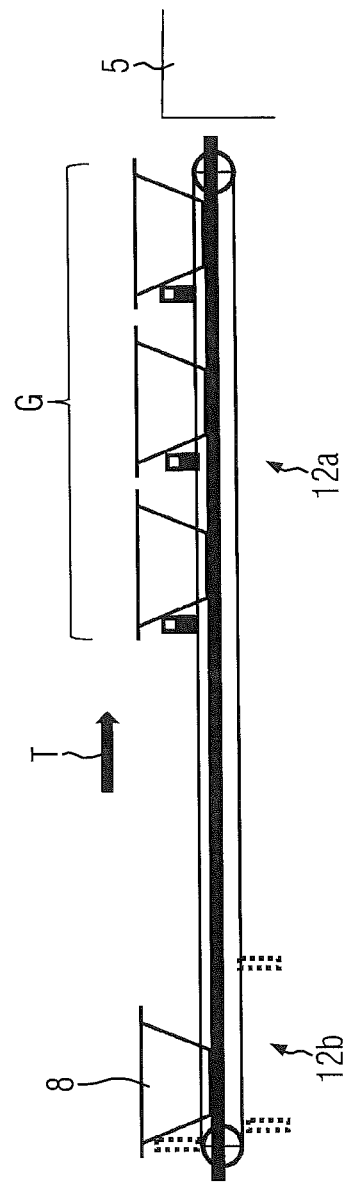
FIG. 2b is a schematic side view of the tray feeder of FIG. 1 with a group of trays in a removal position.

In the further course, illustration of the chain feeder 2 is omitted and in FIG. 2b, the first train chain 12a has transported the group G of three trays 8 to a removal position to the end of the tray feeder 3, while the second train chain 12b collects further trays 8.

Figure 2C:
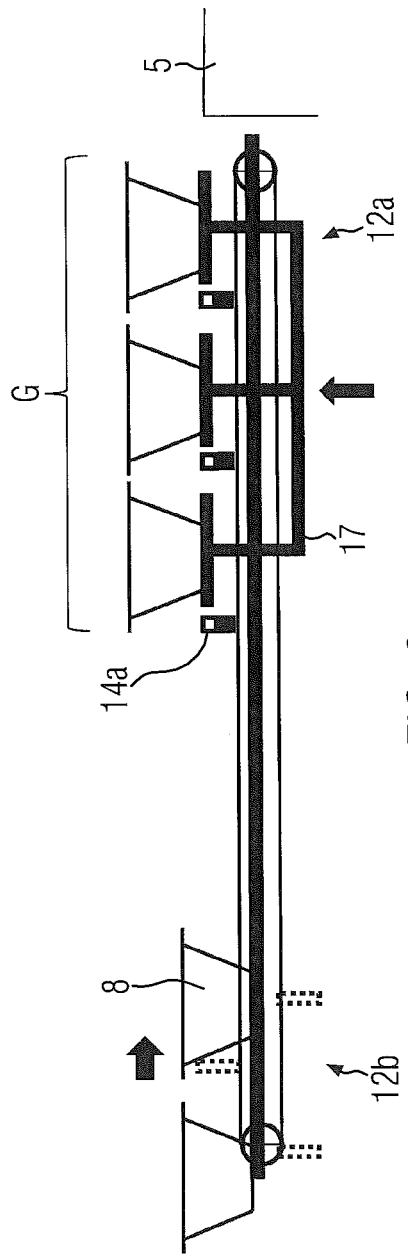
FIG. 2c is a schematic side view of the tray feeder of FIG. 1 with a lifting device activated.

FIG. 2c shows a lifting device 17 being configured to raise the group G of trays 8 from the transport support 16 so far upwardly that the base of the trays 8 is located above the pusher elements 14a. Collision of the trays 8 with the pusher elements 14a during the gripper motion in the direction of the sealing station 5 can thereby be prevented.

Figure 2D:
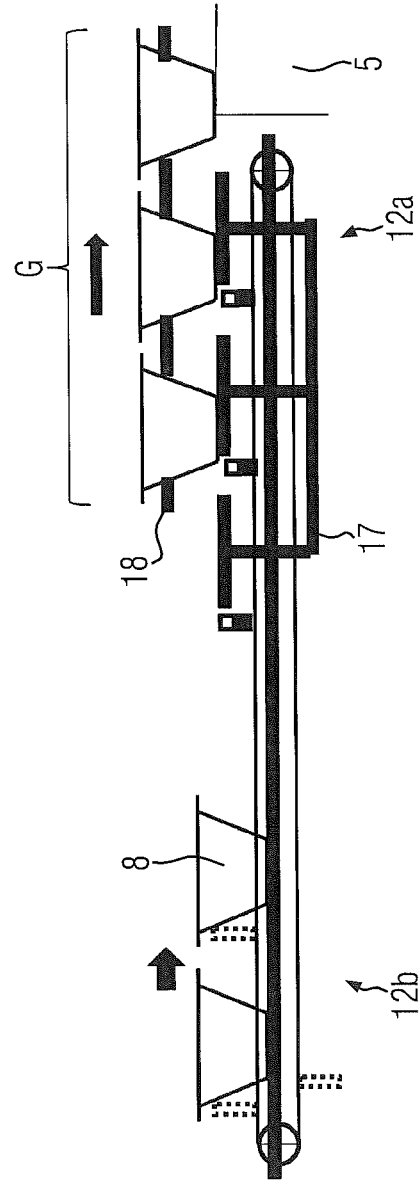
FIG. 2d is a schematic side view of the tray feeder of FIG. 1 with a gripper system collecting the group of trays.

FIG. 2d shows the trays 8 when being transferred from the tray feeder 3 into the sealing station 5 of the tray sealer 4 by a gripper system 18, which is shown only schematically. The second train chain 12b meanwhile collects further trays 8. In the sealing station 5, the trays are evacuated and/or aerated or simply sealed with a top film in an airtight manner.

One variant is also conceivable in which a loading station is provided at the end of the tray feeder 3 along the transport path of the tray feeder 3 downstream of the transfer of the trays 8 and upstream of the removal position. In this case, a further third train chain is provided so that a group G of trays 8 moves, for example, below a filler for filling them with a liquid or pasty product and the trays 8 can simultaneously or sequentially be added this further product and thereby be completed, before they are in the downstream sealing station 5 evacuated and/or aerated or simply sealed with a top film in an airtight manner.

The chain feeder 2 can instead of a link chain 6 with pusher elements 7 also be designed as a link chain belt.

As is evident from the foregoing description, certain aspects of the present invention are not limited to the particular details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention.

Other aspects, objects, and advantages of the present invention can be obtained from a study of the drawings, the disclosures, and the appended claims.

What is claimed is:

1. A tray sealer comprising:
   a tray feeder for collecting a plurality of trays from a continuously moving chain feeder and for grouping said trays, said tray feeder comprising a first train chain and a second train chain, each of said train chains having a drive and one or more pusher elements; and
   a control unit that controls said first and said second train chains such that a first group of said trays provided upstream of said chain feeder is collected by said first train chain at a collection position while a second group of said trays on said tray feeder is transported by said second train chain independently of said first group of said trays to a removal position at which said second group of said trays is collected by a gripper system, wherein said gripper system is disposed proximate a downstream end said tray feeder in a direction of transport of said trays.

2. The tray sealer according to claim 1, wherein said first and second groups include the same number of said trays.

3. The tray sealer according to claim 2, wherein said first and second train chains transport said groups of said trays along a common track.

4. The tray sealer according to claim 1 further comprising a lifting device to position said trays for further transport by said gripper system, and wherein said gripper system transports said trays from said tray feeder into a tray sealing station.

5. The tray sealer according to claim 2 further comprising a sealing station, wherein the number of said trays of said first and said second groups of trays is equal to a number of trays able to be gripped by said gripper system at one time, wherein said gripper system transfers one of said first or said second group of trays from said tray feeder into said sealing station all together.

6. The tray sealer according to claim 1, wherein said continuously moving chain feeder is disposed upstream of said tray feeder in a direction of transport of said trays.

7. The tray sealer according to claim 6, wherein a sensor is provided proximate a downstream end of said continuously moving chain feeder in said direction of transport, said sensor operable to make a detection of the presence of one or more trays proximate said downstream end of said continuously moving chain feeder prior to said tray being transferred to said tray feeder.

8. The tray sealer according to claim 7 further comprising a control unit for monitoring and evaluating said sensor and for controlling said tray feeder in response to said detection of said sensor.

9. The tray sealer according to claim 8, wherein said control unit stops the movement of whichever of the first or second train chain that is collecting one of said first or said second group of said trays on said tray feeder when said detection of said sensor indicates no tray is present proximate said downstream end of said continuously moving chain feeder.

10. A method for operating a packaging facility having a tray sealer comprising:
    providing a continuously moving chain feeder for conveying a plurality of trays;
    transferring said plurality of trays from said chain feeder individually and one-at-a-time to a first train chain of a tray feeder at a collecting position of said tray feeder; and
    collecting a first group of said plurality of trays on said first train chain at said collection position, wherein said first group comprises more than one of said plurality of trays.

11. The method according to claim 10, further comprising:
    moving said first train chain at a higher speed than a second train chain at least temporarily after the collection of said first group;
    transferring said one or more trays from said chain feeder to said second train chain of said tray feeder at said collection position; and
    collecting a second group of said plurality of trays on said second train chain at said collection position, wherein said second group comprises more than one of said plurality of trays.

12. The method according to claim 10 further comprising:
    removing said first group from said first train chain to a said tray sealer at a discharge position of said tray feeder; and
    moving said first train chain from said discharge position to said collection position of said tray feeder after said removing step and before, during, or after said collecting of said second group of said plurality of trays on said second train chain.

* * * * *